(12) United States Patent
Etkin et al.

(10) Patent No.: US 9,185,629 B2
(45) Date of Patent: Nov. 10, 2015

(54) MULTI-HOP NETWORK HAVING REDUCED POWER CONSUMPTION

(75) Inventors: Raul Hernan Etkin, San Francisco, CA (US); Sung-Ju Lee, San Francisco, CA (US); Jung Gun Lee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1410 days.

(21) Appl. No.: 12/579,604

(22) Filed: Oct. 15, 2009

(65) Prior Publication Data

US 2011/0090803 A1    Apr. 21, 2011

(51) Int. Cl.
   *H04W 52/02* (2009.01)
   *H04L 12/28* (2006.01)
   *H04W 40/02* (2009.01)
   *H04W 40/08* (2009.01)
   *H04W 84/18* (2009.01)

(52) U.S. Cl.
   CPC ........ *H04W 40/023* (2013.01); *H04W 52/0219* (2013.01); *H04W 40/08* (2013.01); *H04W 52/0238* (2013.01); *H04W 84/18* (2013.01); *Y02B 60/50* (2013.01)

(58) Field of Classification Search
   USPC .......... 370/238, 252, 315, 389, 432; 455/11.1
   See application file for complete search history.

(56) References Cited

U.S. PATENT DOCUMENTS

| | | | |
|---|---|---|---|
| 7,349,360 B2 * | 3/2008 | Gutierrez et al. | 370/315 |
| 2005/0249215 A1 | 11/2005 | Kelsey et al. | |
| 2006/0281404 A1 * | 12/2006 | Lee et al. | 455/11.1 |
| 2007/0076740 A1 * | 4/2007 | Manjeshwar | 370/432 |
| 2008/0144493 A1 * | 6/2008 | Yeh | 370/230 |
| 2009/0046712 A1 * | 2/2009 | Nordmark et al. | 370/389 |
| 2009/0141667 A1 * | 6/2009 | Jin et al. | 370/315 |

\* cited by examiner

*Primary Examiner* — Awet Haile
(74) *Attorney, Agent, or Firm* — Thorpe, North & Western L.L.P.

(57) ABSTRACT

The present disclosure is directed to networks having reduced power consumption characteristics and associated methods. In one aspect, a method for reducing power consumption in a multi-hop network can include receiving data at a plurality of primary nodes in a multi-hop network and transmitting the data from the plurality of primary nodes to a plurality of secondary nodes. Individual primary nodes have nearest neighbors at a defined distance and the secondary nodes are spaced at a distance that is greater than the defined distance away from individual primary nodes. Data is transmitted from a given primary node to a secondary node by skipping at least one intervening node and reducing power consumption of the wireless network.

20 Claims, 4 Drawing Sheets

MULTI-HOP NETWORK HAVING REDUCED POWER CONSUMPTION

BACKGROUND

In multi-hop networks, nodes relay each other's data node to node (i.e. a hop) until reaching a destination. Typical multi-hop relaying schemes use the nearest neighbor node as a relay with the goal of minimizing the transmission power and interference caused to other transmissions. In many applications of multi-hop networks, the nodes forming the network operate using limited energy sources, such as batteries, solar cells, etc. Minimizing the power consumption of such networks can be important in order to maximize the lifespan of the nodes and to minimize operation cost.

DETAILED DESCRIPTION

Figure 1:
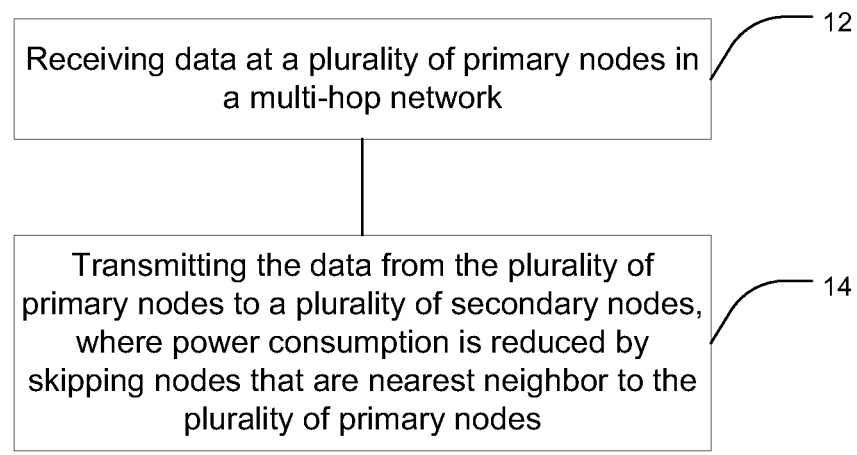
FIG. 1 depicts a method for reducing power consumption in a multi-hop network in accordance with one embodiment of the present disclosure.

Before the present technology is disclosed and described, it is to be understood that this technology is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present technology, the following terminology will be used in accordance with the definitions set forth below.

It is noted that, as used herein, the singular forms of "a," "an," and "the" include plural referents unless the context clearly dictates otherwise. Thus, for example, reference to "a node" includes one or more of such nodes; reference to "an interfering transmission" includes reference to one or more such transmissions; and reference to "the control system" includes reference to one or more such systems.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, the term "nearest neighbor" refers to a neighbor node having a shortest transmission distance to a primary node in a given direction. In the case of a primary/secondary node pair, a nearest neighbor would be a node that has a shorter transmission distance to the primary node than from the primary node to the secondary node.

As used herein, the term "defined distance" refers to a distance between two nodes. A defined distance can be a distance that is the same or substantially the same for all nodes in the network, or a defined distance can be a distance that is different for different node pairs. It should be noted that distance terms used herein can refer, in some aspects to Euclidean distance, and in other aspects to signal attenuation.

As used herein, "transmission axis," when used in conjunction with a directional antenna, refers to a direction in which a majority of energy radiated from the antenna is directed.

As is used herein, "orthogonal channels" refers to different channels that can be used by different transmitters without causing interference with respect to the transmission.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The present technology is directed to multi-hop networks that exhibit reduced power consumption characteristics and associated methods. In various applications of multi-hop networks, the nodes forming the network operate using limited energy resources, such as batteries, solar cells, and the like. Minimizing power consumption can be of importance to maximize the effective lifetime of the nodes. By skipping nearest neighbor nodes in transmissions, or in other words decreasing the number of hops required to transmit data, energy resources can be preserved and node life can be increased. Without intending to be bound by any theory of operation, longer hops allow a reduction in the aggregate data rate that each node needs to relay, which in turn allows a reduction in the duty cycle of the nodes. A smaller duty cycle results in power reductions because nodes consume less power when they are set in power save mode. The power savings arising from smaller duty cycle often compensate for the increase in transmission power that may (or may not) be necessary, resulting in overall power saving gains. In addition to saving energy resources, reducing the number of hops that are used to reach a final destination can reduce end-to-end delay and increase the reliability of the network by reducing exposure to node failures, buffer overflows, and the like.

In one example embodiment, as shown in FIG. 1, a method for reducing power consumption in a multi-hop network is provided. Such a method can include receiving data at a plurality of primary nodes in a multi-hop network 12 and transmitting the data from the plurality of primary nodes to a plurality of secondary nodes. Individual primary nodes have nearest neighbors at a defined distance and the secondary nodes are spaced at a distance that is greater than the defined distance away from individual primary nodes 14. In other words, data is transmitted from a given primary node to a secondary node by skipping at least one intervening node. This "node-skipping" process reduces power consumption by the network, as is discussed herein. It should be noted that receiving data at a plurality of primary nodes can include receiving data from a previous node, or it can include having the data available locally at the primary node. Furthermore, a primary node can be the first node in a transmission pathway, or a primary node can be a node that, having received data from a previous node, transmits data to a secondary or subsequent node. Thus the terms primary and secondary should be seen as relative to one another, rather than as relative to the origination of data transmission. Thus primary and secondary nodes can be located at the beginning, middle, or end of a data path.

The number of nodes that can be skipped during data transmission can vary depending on the configuration of the network. In one embodiment, the transmission of data from a primary node to a secondary node can skip one intervening node, or in other words, one nearest neighbor. In another embodiment, the transmission of data from a primary node to a secondary node can skip at least one intervening node. In yet another embodiment, the transmission of data from a primary node to a secondary node can skip at least two intervening nodes. In another embodiment, the transmission of data from a primary node to a secondary node can skip at least three intervening nodes. In a further embodiment, the transmission of data from a primary node to a secondary node can skip at least four intervening nodes.

In a typical multi-hop network, the power consumption of each node is not proportional to the power used for communication. For example, typical power consumption figures for a wireless IEEE 802.11b/g transceiver can be as follows, described as energy/unit time:

719.4 mW (802.11b Tx mode)
481.8 mW (802.11b Rx mode)
531.2 mW (802.11g Tx mode)
574.3 mW (802.11g Rx mode)
19.8 mW (IEEE Power Save (PSP) mode)

These figures illustrate that the power consumed by the encoder/decoder logic, modulator/demodulator, and channel estimators can equal or exceed the radiated power used in the actual transmission of the wireless signal. It should also be noted that in 802.11g operation mode, the transceiver module discussed above consumes more power when receiving than transmitting. Accordingly, in order to minimize power consumption it can be beneficial to minimize the active time of a transceiver by maximizing the amount to time the transceiver is in power saving mode.

Figure 2:
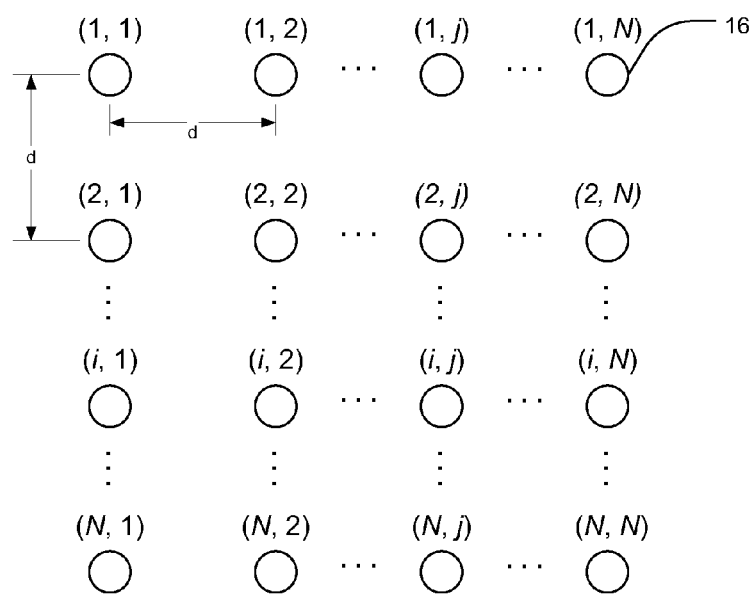
FIG. 2 depicts a simplified network layout in accordance with another embodiment of the present disclosure.

For the sake of simplicity, a multi-hop network can be illustrated as is shown in FIG. 2, where the nodes 16 are placed in a regular two-dimensional array with space d between the nodes. It should be noted that this two-dimensional array is meant to be merely exemplary, and network arrays having one-, two-, and three-dimensional configurations are additionally within the present scope. Additionally, the regular spacing of the nodes in FIG. 2 is also merely exemplary. The present scope should include arrays having irregular as well as regular node spacing.

Referring again to FIG. 2, the network can be described mathematically as follows: let Equation 1 be the node located in row i and column j of the network array.

$$(i,j) \in [1, N] \times [1, N] \qquad \text{Equation 1}$$

In traditional multi-hop networks, each node sends data to nearest neighbors in a stepwise fashion. In other words, each node (i, j) sends data to a number of stepwise nearest neighbor nodes (i, N), where i=1, . . . , N. Thus the data from node (i, j) is relayed by nodes (i, j+1), (i, j+2), . . . , (i, N−1) until reaching node (i, N). In one non-limiting aspect, for example, it is assumed that each node needs to send data at a rate of R [bits/sec], and node (i, k) needs to transmit on its own wireless link at a rate of kR to accommodate the transmission of the node's own data plus the data that is being relayed from nearest neighbor nodes.

Figure 3:
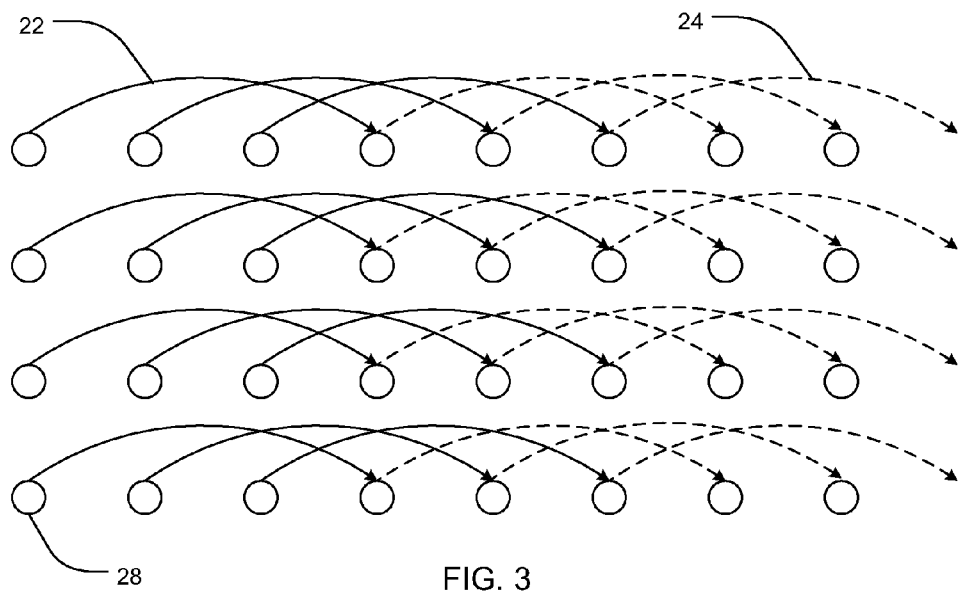
FIG. 3 depicts a simplified network layout showing node skipping in accordance with yet another embodiment of the present disclosure.

By using longer hops as compared to traditional network routing, power consumption can be decreased and network efficiency can be increased. Thus instead of using nearest neighbor nodes as a relay at a distance of d, the nodes can send data from a primary node to a secondary node at a distance of md, where m represents the distance in terms of number of nodes from the primary node to the secondary node. This is shown graphically in FIG. 3 for m=3. Thus the data of node (i, j) is relayed by nodes (i, j+m), (i, j+2m), etc., or for the network shown in FIG. 3, is relayed by nodes (i, 3), (i, 6), etc. The first hop 22 for data from a node 28 is shown as a solid line, while subsequent hops 24 are shown as dashed lines. Because the data that each node transmits in its wireless link includes its own data plus data relayed from nodes upstream in the multi-hop chain, a reduction factor of m in the number of hops results in a reduction factor of m in the amount of data that needs to be relayed. Accordingly, the throughput requirements of the wireless links can be reduced by a factor of m.

In another embodiment, multi-hop networks exhibiting reduced power consumption characteristics are provided. Such a network can include a plurality of primary nodes having a plurality of transmitters and a plurality of transmission antennas operable to transmit data, and a plurality of secondary nodes having a plurality of receivers and a plurality of reception antennas operable to receive data from the plurality of primary nodes. It should be noted that each node can have a single or multiple antennas. These antennas can be used in various ways (e.g. to obtain antenna gains as a phased array, to obtain power gains by beamforming, to obtain multiplexing gains through multiple input multiple output (MIMO) communication techniques, to obtain diversity gains and reduce outage probability, etc.). A single antenna can also function both as a transmitter and a receiver. It should thus be understood that a primary node transmitting data will necessarily be associated with a transmission antenna, and a secondary node receiving data will necessarily be associated with a reception antenna.

The individual primary nodes have nearest neighbors at a defined distance, and individual secondary nodes are spaced at a distance that is greater than the defined distance away from individual primary nodes. Additionally, the network is configured to reduce power consumption by skipping nodes that are within a nearest neighbor distance to the plurality of primary nodes. A primary node can transmit data to a single secondary node or to multiple secondary nodes depending on the configuration and intended use of the network. Additionally, a primary node can be any node that is transmitting data. As such, a node can receive data as a secondary node, and then subsequently (or simultaneously) transmit data as a primary node.

Figure 4:
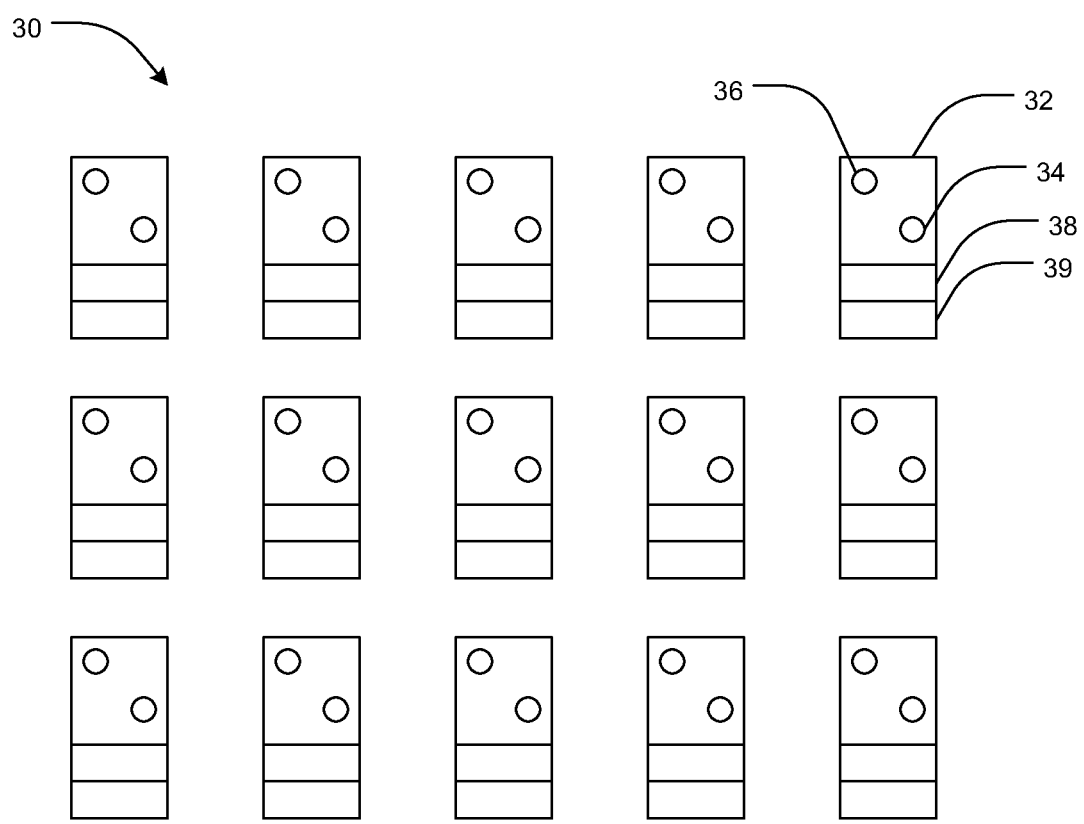
FIG. 4 depicts a simplified network layout showing node details in accordance with a further embodiment of the present disclosure.

A multi-hop network according to one embodiment is shown in FIG. 4. The network 30 includes a plurality of nodes 32, where each node is functionally associated with a transceiver (transmitter and receiver) 34 and an antenna 36. It should be noted that in some embodiments a node can have a separate receiver and transmitter. In another embodiment, a node can have an antenna that functions for both transmitting and receiving radio signals. A node can function as a primary node when transmitting data via the transmitter and antenna, and a node can function as a secondary node when receiving data via the receiver and antenna. Thus a primary node can be associated with a transmitter and a transmission antenna, and a secondary node can be associated with a receiver and a reception antenna. In some embodiments, a node with multiple radios can simultaneously transmit and receive data, and thus would be functioning as a primary node with respect to the transmission of data and as a secondary node with respect to the reception of data.

The nodes can also each include a computational system 38 that is functionally coupled to the plurality of nodes 32. The computational system is operable to determine the distance between the plurality of primary nodes and the plurality of secondary nodes. A computational system can be physically associated with a single node, as is shown in FIG. 4, or a computational system can be associated with multiple nodes (not shown).

In one embodiment, the primary and secondary nodes of a multi-hop network can include a power source 39. Any power source capable of providing power to the nodes should be considered to be within the present scope. Non-limiting examples can include batteries, solar cells, AC sources, DC sources, energy scavenging devices, and combinations thereof. Energy scavenging devices can scavenge energy from a variety of sources, including vibrations, wind, fluid flow, heat, etc.

Figure 5:
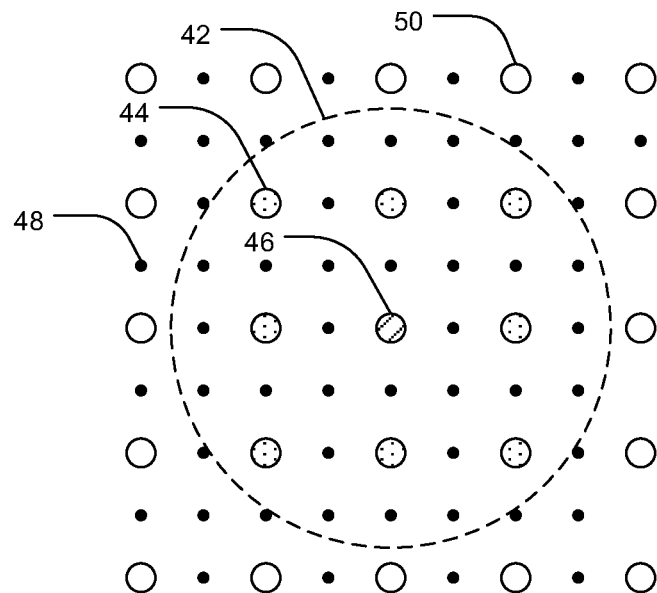
FIG. 5 depicts a simplified network layout showing an interference transmission avoidance radius in accordance with another embodiment of the present disclosure.

One difficulty that can arise when skipping nodes and increasing the distance of data transmission is the increased problem associated with transmission interference. In other words, the greater the transmission distance, the greater the area over which transmissions from other nodes can cause interference. As such, it can be beneficial to limit transmissions within a reception radius of a given secondary node to the transmission signal from the primary node of the primary/secondary node pair. Avoiding interfering transmissions can include techniques that allow nodes to share wireless spectrum, such as time division multiple access (TDMA), frequency division multiple access (FDMA), code division multiple access (CDMA), frequency hopping, as well as other frequency sharing approaches. Thus for an omnidirectional antenna, as is shown in FIG. 5, the radius of interfering transmission prevention 42 can be set to a distance from a given secondary node 46 that precludes the simultaneous transmission of more than one primary node 44 within this radius. Thus, the interfering transmission radius is defined around a secondary node. Nearest neighbor nodes 48 are skipped, and 50 represents nodes that are at a larger distance from the secondary node than the interference prevention radius, and as a result, can potentially function as primary nodes for some other simultaneous primary-secondary node data transmissions.

Various methods can be used to avoid interfering transmissions within the transmission interference radius. In one embodiment, for example, the various primary nodes within the radius transmit data at different times (TDMA) in order to prevent interfering transmissions in the same frequency channel within the interference radius. Thus, in such a timesharing method, only one primary node within the radius is transmitting at a given time. In another embodiment, the various primary nodes within the radius transmit data using different frequencies (FDMA) possibly at the same time. In other words, multiple primary nodes can simultaneously transmit within the radius, provided they are transmitting on different frequencies that do not substantially interfere. In another embodiment, the various primary nodes within the radius can transmit data at the same time and the same frequency, provided these nodes are using different spreading codes as in, for example, CDMA communication protocols. In yet another embodiment, the various primary nodes can utilize FDMA, TDMA, CDMA, or any combination of these techniques to transmit data within the radius.

Let r be the interference prevention radius used in a traditional multi-hop network where primary-secondary node pairs are nearest neighbors. The value of r is chosen to achieve a given signal-to-interference-plus-noise (SINR) in the radio transmissions. It should be noted that r can be chosen by one of ordinary skill in the art as desired according to a particular network design. In one embodiment of the present invention, let m be the distance in terms of number of nodes from the primary node to the secondary node. Then the radius of interfering transmission avoidance should be r'=m*r. For example, when node (i, j) is receiving a transmission from a primary node, any other nodes (s, t) with s and t within the bounds represented by Equations 2 and 3 (where for simplicity it is assumed that r/d is an integer) will be configured not to transmit in the same frequency channel and timeslot as the desired primary transmitter.

$$s \in [i-mr/d, i+mr/d] \quad \text{Equation 2}$$

$$t \in [j-mr/d, j+mr/d] \quad \text{Equation 3}$$

For networks operating in an interference limited regime, the goal of increasing the interference prevention radius m times is to preserve the signal-to-interference plus noise ratio (SINR), and hence the available throughput over longer transmission distances. Without increasing the distance to the nearest interfering sources, longer hops can result in a significant loss of SINR and network capacity.

The need to increase the distance to the nearest interfering sources can be seen when considering the capacity expression for a wireless link, as is shown in Equation 4. It should be noted that the following analysis is based on a simplified communication model and theoretical capacity expressions. In practice the actual achievable data rates and their dependency on the signal power S, aggregate interference power I, and background noise power N may be the same or somewhat different.

$$C = W \log_2 \left( 1 + \frac{S}{N+I} \right) \quad \text{Equation 4}$$

From which, after replacing S, N, and I by the expressions given in Equations 5, 6, and 7:

$$S = |h_{ik}|^2 P \quad \text{Equation 5}$$

$$N = N_0 W \quad \text{Equation 6}$$

$$I = \Sigma_{j \in t \setminus \{k\}} |h_{ij}|^2 P \quad \text{Equation 7}$$

we arrive at Equation 8:

$$C = W \log_2 \left( 1 + \frac{|h_{ik}|^2 P}{N_0 W + \Sigma_{j \in T \setminus \{k\}} |h_{ij}|^2 P} \right) [b/s] \quad \text{Equation 8}$$

where W is the channel bandwidth, P is the transmission power of the nodes, $N_0$ is the background noise power spectral density, and $|h_{ij}|^2$ is the channel (power) gain between transmitter j and receiver i. To simplify the analysis, we assumed that all nodes use the same transmission power P, noting that in a more general setting it is possible for different nodes to use different transmission powers. The channel gain $|h_{ij}|^2$ can be approximated as $|h_{ij}|^2 = K|d_{ij}|^{-\alpha}$, where $\alpha \geq 2$ is the path loss exponent, K is a constant that depends on the antenna gains and carrier frequency, and $d_{ij}$ is the (Euclidean) distance between nodes i and j. It should be noted that this is a simplified path loss model, and that the actual channel gain may have other functional dependence on distance, and may include other factors due to shadowing, multipath fading, etc. In the sum in the denominator of Equation 8, T is the set of nodes transmitting at the same time and frequency channel as the transmitter of interest. As long as N is much smaller than I (e.g. one or more orders of magnitude smaller), the wireless link operates in the interference limited regime, and the capacity remains approximately constant if both the signal power S and the interference power I are increased/decreased by the same factor. When the transmitter-receiver distance is increased by a factor of m, S decreases by a factor of $m^{-\alpha}$, and the interference term I should be decreased by the same factor in order to preserve the S/I relationship. This can be accomplished by increasing the distance to the nearest interfering sources by a factor of m, which dominate the interference term I.

The interference prevention radius can be increased m times by reducing the active time of each node by a factor of $1/m^2$ and time sharing data transmissions among the transmitters located within the radius. This increase in the interference prevention radius and corresponding reduction in the nodes' active time can result in a power saving factor of $q=1/m^2$. However, reducing the active time of the nodes by a factor of $q=1/m^2$ can result in a reduction of the available capacity of the wireless links by approximately the same factor. Since the actual throughput requirements are reduced by a factor of m due to the longer hops, the actual throughput degradation of the wireless network due to the use of a smaller active time is a factor of $(1/m^2)(m)=1/m=q^{1/2}$.

Accordingly, in one embodiment of the present technology, the computational system is operable to calculate an interference prevention radius that is greater than the radius that would be used when primary-secondary node pairs are nearest neighbors. The interference prevention radius can be defined as an area around the secondary node within which only a single primary node can transmit at a given time and frequency (and code, if using CDMA). In one embodiment, the computational system is operable to allow multiple primary nodes within the interference prevention radius to transmit on the same frequency channel at different times. In another embodiment, the computational system is operable to allow multiple primary nodes within the interference prevention radius to transmit at the same time using different frequencies. In yet another embodiment, the computational system is operable to allow multiple primary nodes within the interference prevention radius to transmit data at the same time and the same frequency, provided these nodes are using different spreading codes.

Figure 6:
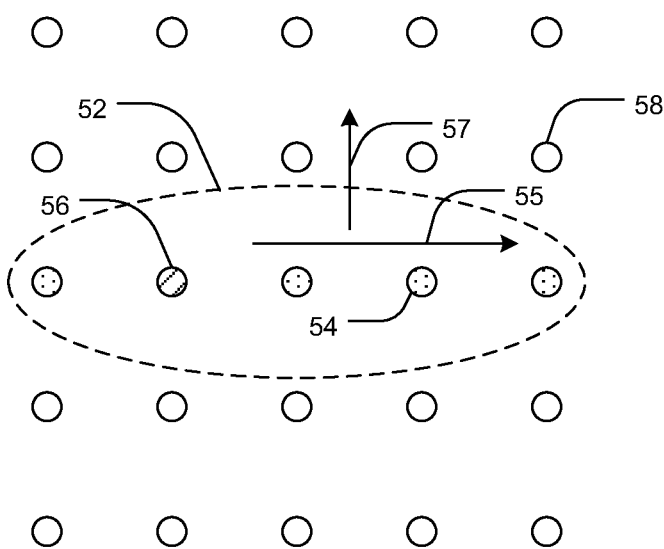
FIG. 6 depicts a simplified network layout showing an interference transmission avoidance area for nodes using directional antennas in accordance with yet another embodiment of the present disclosure.

The above discussion assumes nodes having omnidirectional antennas functionally associated therewith. For nodes associated with directional antennas, such as an antenna array with beamforming, it is possible to reduce the area of interfering transmission prevention. As is shown in FIG. 6, data is transmitted from a primary node 56 via a directional antenna along an axis of transmission 55. 52 represents an area of interfering transmission prevention, and 54 represents a secondary node. Thus interfering transmissions can be prevented within an area surrounding the secondary node that has different lengths in the direction parallel and perpendicular to the axis of transmission of the directional antenna. The length of the interference prevention area in the direction parallel to the axis of transmission is larger than the length in the direction perpendicular to the axis of transmission. The computational system is operable to calculate this area and its corresponding dimensions in all directions, and in particular in the directions parallel and perpendicular to the axis of transmission. In other words, utilizing directional antennas allows the interfering transmission prevention distance to be smaller in a direction perpendicular to the transmission axis. Note that nearest neighbor nodes are not shown in FIG. 6 for clarity, and 58 represents nodes that are at a distance from the secondary node so as to be allowed to transmit at the same time in the same frequency channel as the primary node 56.

For example, when node (i, j) is receiving a transmission from a primary node, any other nodes (s, t) with s and t within the bounds represented by Equations 9 and 10 will be prevented from transmitting in the same frequency channel and timeslot as the desired primary transmitter.

$$s \in [i-nr/d, i+nr/d] \qquad \text{Equation 9}$$

$$t \in [j-mr/d, j+mr/d] \qquad \text{Equation 10}$$

The parameter n ($1 \le n \le m$) can be chosen as a function of the antenna gain so that the SINR is approximately preserved as compared to the traditional nearest neighbor hop scheme. The area where interfering transmissions are excluded can be increased by a factor of nm as compared to the traditional short hop approach. Also, following the above analysis where q is the active duty cycle fraction, $q=1/(nm)$ and the total throughput degradation factor is $[1/(nm)](m)=1/n=q^b$ with $b=\log(n)/\log(nm)$. It should be noted that $0 \le b \le 0.5$.

Thus in wireless networks having primary nodes transmitting along a transmission axis via directional antennas, a computational system can be operable to calculate an axial transmission distance for a primary node that represents the effective transmission distance of that node along the transmission axis. In one embodiment, the computational system is operable to compute an interference prevention region centered at the secondary node. This region has different lengths along the direction parallel to the transmission axis and perpendicular to the transmission axis. The length along the direction parallel to the transmission axis is larger than the length perpendicular to the transmission axis. Additionally, the computational system is operable to prevent interfering transmissions within the interfering prevention region. This is done by preventing other nodes within this region from transmitting at the same time and same frequency channel as the desired primary transmitter. As has been described, the computational system can also prevent interference by allowing multiple primary nodes within the interference prevention radius to transmit data at the same time and the same frequency, but providing that these nodes use different spreading codes.

The previous analysis demonstrates that the present technology allows the reduction of the fraction of time over which nodes are active by a factor q (0<q<1), thus achieving a similar factor in power savings, with a network throughput degradation $q^b$ with $0 \le b \le 0.5$. The traditional power saving approach of simply reducing the active time by a factor q results in a network throughput degradation factor of q. Comparing the two approaches for the same power savings factor q, a throughput gain factor $q^b/q=1/q^{1-b}$ is obtained, which is large if q is small. For example, if $q=0.1$ and $b=0.5$, the present technology allows more than triple the network throughput.

A similar comparison can be accomplished by fixing the required network throughput. In this case, let $q_1$ be the power saving factor used in traditional power saving approaches, and $q_2$ be the power saving factor used in the present applications. If it is assumed that the network throughput is about the same for both approaches, then $q_1=q_2^b$, or equivalently $q_2=q_1^{1/b}$. For example, assume the power consumption is reduced in the baseline case 10 times, setting $q_1=0.1$. For $b=0.5$, $q_2=0.01$ is obtained, thus demonstrating a reduction of power consumption of 100 times, or a 10 gain factor in power savings as compared to traditional power reduction schemes. Accordingly, applications that benefit from very small power consumption can see significant performance improvements according to present embodiments.

In addition to obtaining savings in power consumption and/or network throughput, the networks according to embodiments described reduce the total number of hops used in the multi-hop communication scheme. Each hop introduces some delay due to the encoding, decoding, and scheduling of the data packets. Fewer hops, therefore, result in a reduction of the end-to-end delay, which is beneficial in many delay-sensitive applications. In addition, such a network can provide advantages in terms of reliability for having fewer hops. Data can be lost in a multi-hop network due to various factors: errors due to noise and random channel fading, buffer overflows, node failures, and the like. Assuming that data is lost in each hop with probability p, using the union bound for probabilities, after k hops the probability of losing data is upper bounded by kp. Therefore, reducing the number of hops by a factor m can result in a similar factor reduction in data loss probability upper bound.

While the present technology has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

The invention claimed is:

1. A method for reducing power consumption in a multi-hop network, comprising:
   receiving data at a primary node in the multi-hop network;
   identifying one or more nearest neighbor nodes associated with the primary node; and
   transmitting the data from the primary node to a secondary node by skipping the identified one or more nearest neighbor nodes to reduce power consumption of the multi-hop network, wherein the identified one or more nearest neighbor nodes are each provided at a defined distance from the primary node and are provided between the primary node and the secondary node, and the secondary node is provided at a distance, from the primary node, greater than the defined distance.

2. The method of claim 1, further comprising skipping at least two nodes located between the secondary node and the primary node.

3. The method of claim 1, further comprising skipping at least three nodes located between the secondary node and the primary node.

4. The method of claim 1, further comprising avoiding interfering transmissions within an interference radius.

5. The method of claim 4, wherein avoiding interfering transmissions within the interference radius includes using orthogonal channels for all primary nodes transmitting within the interference radius.

6. The method of claim 4, wherein orthogonal channels can utilize a member selected from the group consisting of time division multiple access, frequency division multiple access, code division multiple access, or a combination thereof.

7. The method of claim 1, further comprising decreasing end-to-end delay by skipping all of the one or more nearest neighbor nodes.

8. The method of claim 1, wherein each of the one or more nearest neighbor nodes is provided at the shortest distance from the primary node for a particular direction of transmission from the primary node.

9. A multi-hop wireless network having reduced power consumption, comprising:
   a primary node having a transmitter and a transmission antenna to transmit data; and
   a secondary node having a receiver and a reception antenna to receive data from the primary node, wherein the network is to identify one or more nearest neighbor nodes provided at a defined distance from the primary node and provided between the primary node and the secondary node, wherein the secondary node is provided at a distance from the primary node greater than the defined distance, and wherein the network is to reduce power consumption by skipping the identified one or more nearest neighbor nodes when transmitting from the primary node to the secondary node.

10. The wireless network of claim 9, further comprising a computational system coupled to the primary node and to the secondary node, wherein the computation system is to determine an approximate distance between the primary node and the secondary node.

11. The wireless network of claim 10, wherein the computational system is to calculate an interference prevention radius, and wherein the computational system is to prevent interfering transmissions within the interference prevention radius.

12. The wireless network of claim 10, wherein preventing interfering transmissions within the interference radius includes using orthogonal channels for all primary nodes transmitting within the interference radius.

13. The wireless network of claim 12, wherein orthogonal channels can utilize a member selected from the group consisting of time division multiple access, frequency division multiple access, code division multiple access, or a combination thereof.

14. The wireless network of claim 9, wherein the transmission antenna is a directional antenna having a transmission axis.

15. The wireless network of claim 14, further comprising a computational system functionally coupled to the primary node and to the secondary node, wherein the computation system is to calculate an interference prevention region around the secondary node, and wherein the computational system is to prevent interfering transmissions within the interference prevention region.

16. The wireless network of claim 15, wherein the computational system is to calculate an interference prevention region that is longer in the direction parallel to the transmission axis and shorter in the direction perpendicular to the transmission axis, wherein the computational system is to prevent interfering transmissions within the interference prevention region.

17. The wireless network of claim 9, wherein the primary node and the secondary node each has a respective power source selected from the group consisting of a battery, a solar cell, AC current, DC current, energy scavenging devices, and combinations thereof.

18. A first node for use with a multi-hop wireless network, comprising:
   a computational system to determine a distance between a primary node and a secondary node and to identify one or more nearest neighbor nodes associated with the primary node, wherein the one or more nearest neighbor nodes are provided at a defined distance from the primary node and are provided between the primary node and the secondary node, wherein the distance between the primary node and the secondary node is greater than the defined distance, and wherein the computational system is to cause power consumption reduction by causing the primary node to skip the identified one or more nearest neighbor nodes when transmitting from the primary node to the secondary node.

19. The first node of claim 18, wherein the primary node comprises a transmitter coupled to at least one transmission antenna and the secondary node comprises a receiver coupled to at least one reception antenna.

20. The first node of claim 18, wherein the first node is one of the primary node and the secondary node.

\* \* \* \* \*